United States Patent [19]
Torregrossa

[11] Patent Number: 5,731,992
[45] Date of Patent: Mar. 24, 1998

[54] METHOD OF REDUCING THE TIME FOR ADJUSTING AND ELECTRONIC FUNCTION IN AN ARTICLE THAT PRESENTS DISPERSION FROM ONE ARTICLE TO ANOTHER

[75] Inventor: Philippe Torregrossa, Origne, France

[73] Assignee: Alcatel Mobile Communication France, Paris, France

[21] Appl. No.: 460,747

[22] Filed: Jun. 2, 1995

[30] Foreign Application Priority Data

Jun. 6, 1994 [FR] France .................. 94 06888

[51] Int. Cl.⁶ .................. G01R 17/00; H04B 17/00
[52] U.S. Cl. .................. 364/552; 364/551.01; 364/571.01; 364/571.04; 364/571.05; 364/571.07; 364/571.08; 379/10; 455/125; 455/67.1; 455/67.4
[58] Field of Search .................. 364/551.01, 571.01, 364/514, 572, 571.02; 379/10, 185; 455/73, 125, 67.1, 67.4

[56] References Cited

U.S. PATENT DOCUMENTS

| | | | |
|---|---|---|---|
| 4,841,461 | 6/1989 | Yamamoto et al. | 364/572 |
| 4,996,647 | 2/1991 | Gasser | 364/572 |
| 5,003,502 | 3/1991 | Davis | 364/572 |
| 5,077,783 | 12/1991 | Leppanen | 379/27 |
| 5,201,063 | 4/1993 | Tam et al. | 455/67.4 |
| 5,281,931 | 1/1994 | Bailey et al. | 455/125 |
| 5,301,118 | 4/1994 | Heck et al. | 364/468.16 |
| 5,335,362 | 8/1994 | Vaisanen et al. | 455/67.1 |
| 5,423,070 | 6/1995 | Vaisanen et al. | 455/67.1 |

FOREIGN PATENT DOCUMENTS

| | | |
|---|---|---|
| 0376666A1 | 7/1990 | European Pat. Off. . |
| 0420506A2 | 4/1991 | European Pat. Off. . |
| 0555524A2 | 8/1993 | European Pat. Off. . |

*Primary Examiner*—Edward R. Cosimano
*Assistant Examiner*—Tuan Q. Dam
*Attorney, Agent, or Firm*—Sughrue, Mion, Zinn, Macpeack & Seas, PLLC

[57] ABSTRACT

A method of adjusting an electronic function implemented in an article that forms a part of a population of articles to be adjusted, the electronic function presenting dispersion from one article to another. When necessary, the method comprises replacing an initial parameter stored in a dispersion correction stage that is coupled to the electronic function with a correction parameter so that the combined response of said function plus the associated correction stage to a predetermined input stimulus lies in a predetermined range. The initial parameter is a centered parameter corresponding to the mean value of the capability curve of correction parameters for the function, the mean value itself being updated whenever the percentage of the population of articles for which test measurements lie outside the predetermined range becomes greater than a predetermined percentage. A large proportion of the measurements performed thus lie within the predetermined range so there is then no need to adjust the function.

3 Claims, 3 Drawing Sheets

PRIOR ART

| m1 | m2 | m3 | m4 | | mn-1 | mn |
|---|---|---|---|---|---|---|
| P1 | P2 | P3 | P4 | | Pn-1 | Pn |

METHOD OF REDUCING THE TIME FOR ADJUSTING AND ELECTRONIC FUNCTION IN AN ARTICLE THAT PRESENTS DISPERSION FROM ONE ARTICLE TO ANOTHER

FIELD OF THE INVENTION

The field of the invention is that of methods of adjusting functions implemented in articles coming off assembly lines, and in particular electronic functions. More particularly, the present invention relates to a method enabling finished articles to be adjusted quickly on the basis of as few measurements of their characteristics as possible. The invention applies in particular to adjusting radiotelephones, such as terminals specified in the Groupe Speciale Mobile (GSM) recommendations for radiotelephones.

BACKGROUND OF THE INVENTION

When parts are mass-produced, they are never absolutely identical to one another at the end of the assembly line. Measurements show up a certain amount of dispersion in characteristics from one part to another, and only those parts whose characteristics lie within a predetermined range of values are considered as satisfactory for any given quality criterion. Any manufacturing process can be defined by a capability coefficient $C_p$ that represents the ability of the process to produce parts within the tolerance limits that have been set.

A batch of electronic articles, e.g. radiotelephones, also exhibits dispersion in operating characteristics because of the tolerances in the components used, so it is necessary to perform adjustments on the articles, or at least on those that do not satisfy pre-established quality criteria. The adjustments may consist in modifying a correction parameter in an analog function, e.g. adjusting a potentiometer, or in a digital function, e.g. changing a value in a random access memory (RAM).

In most cases, the modifiable correction parameter corrects dispersion that has occurred upstream therefrom, or that occurs in its immediate surroundings; more rarely it corrects dispersion that appears downstream. FIG. 1 represents an electronic stage 10 that is to be adjusted by means of a correction stage 11 downstream therefrom.

To enable adjustment to be performed, a stimulus E is applied at the input of the electronic stage 10 which presents dispersion represented by a dispersion function Fd. The electronic stage 10 performs a function, e.g. a voltage-controlled oscillator or filter, delivering a response E1 where E1=Fd(E), which response is to be adjusted. The response E1 is applied to the correction stage 11 which performs a correction function Fc. More precisely, Fc is a function that represents the action of correcting a parameter P in a function F to be compensated. F represents the overall function Fc (Fd). The response of the correction stage 11 is written S=Fc(P,E1)=F(E). The adjustment consists in modifying the parameter P to compensate the function F. The response S can be measured either directly as output by the correction stage 11, or else after passing through a "neutral" stage that is downstream from the correction stage 11 but that does not introduce dispersion in the function being analyzed.

FIG. 2 is a graph showing a capability curve 20 of measurements performed on functions that have been adjusted.

The curve 20 is a Gaussian or "normal distribution" curve lying in a range (Smin, Smax) where Smin and Smax are respective minimum and maximum threshold values. The abscissa corresponds to a physical measurement M of the function F, and the ordinate represents a quantity Q of articles that have been adjusted. The curve 20 is not necessarily centered on (Smin+Smax)/2.

A sophisticated form of adjustment consists in using adjustment algorithms to measure the responses of an article to different stimuli and to correct the digital values stored in the article so that its responses correspond to optimum values. The first measurement is performed with respect to some arbitrary parameter that is stored in the correction stage associated with the function. Since the first measurement is rarely optimum, the correction parameter is modified stepwise in order to seek an optimum response.

OBJECTS AND SUMMARY OF THE INVENTION

That method of adjustment is expensive in time, and an object of the present invention is to mitigate that drawback.

More precisely, one of the objects of the invention is to provide a method that makes it possible to adjust quickly an electronic function implemented in a population of articles and presenting dispersion from one particular article to another.

This object, and others that appear below, is achieved by a method of adjusting an electronic function implemented in an article forming a part of a population of articles to be adjusted. The electronic function presents dispersion from one article to another. Each article includes a dispersion correction stage that is coupled with the electronic function and stores an initial parameter. The method comprises the steps of determining an initial parameter and storing it in each article to be tested, testing an article and replacing the initial parameter with a correction parameter, if necessary. Otherwise, if the initial parameter resulted in an acceptable response, testing for that function is complete. This ensures that the combined response of the electronic function plus said correction stage lies within a predetermined range when a predetermined input stimulus is applied. The initial parameter is a centered parameter corresponding to the mean value of the capability curve of correction parameters for said function, said mean value itself being updated whenever the percentage of the population of articles for which said measurements lie outside said predetermined range becomes greater than a predetermined percentage.

Thus, adjustment of a population of articles comprises an essential first step consisting in storing the centered parameter of the function to be corrected in each correction stage, with this being done before any measurements are made. A large percentage of electronic functions will then provide responses lying in the predetermined range so no adjustment is necessary.

In an advantageous implementation, the method of the invention further consists in:

for a fraction of said population of articles, storing each measurement that lies outside said predetermined range in a table in association with a corresponding correction parameter said measurements constituting "reference" measurements; and for the remainder of said population of articles, whenever a measurement is performed that lies outside said predetermined range, verifying whether there exists a reference measurement in said table that is substantially equal to said measurement, to within a margin epsilon, and if so, replacing said centered parameter with the correction parameter associated with said corresponding reference measurement.

If the measurement is beyond the range epsilon from existing references, then a new correction parameter is determined and added to the reference table.

These steps thus amount to acquiring measurements for a plurality of particular articles, and then, if they lie outside a predetermined range, each measurement is stored together with the corresponding parameter that corrects its divergence (so that after the corrections have been made, the measurements lie within the predetermined range). A table is thus established that includes a correction parameter corresponding to each measurement lying outside the predetermined range and referred to as a "reference" measurement. Thereafter, whenever a measurement is performed that lies outside the predetermined range, the reference measurement in the table closest to the measurement as performed (to within a margin of error, epsilon) is selected for the purpose of replacing the centered parameter with the parameter that is associated with said reference measurement.

It is thus considered that if a particular electronic function to be adjusted plus its correction stage delivers a response that lies outside a certain range, then a similar response given by another article will need to be corrected in the same way, and this gives rise to a considerable saving in the time required for adjustment.

In an advantageous implementation, the method of the invention consists in replacing the centered parameter with a correction parameter so that the response of the function to a predetermined input stimulus as applied thereto lies in the middle of the predetermined range.

That amounts to seeking a response which is optimum within the limits set by the range over which the correction parameter may vary.

Once a centered parameter has been replaced by the parameter associated with the reference measurement, it is preferable to perform a further measurement to confirm that the response of the electronic function to the predetermined stimulus now lies within the predetermined range.

BRIEF DESCRIPTION OF THE DRAWINGS

Other characteristics and advantages of the invention appear on reading the following description of an advantageous implementation given by way of non-limiting illustration and made with reference to the accompanying drawings, in which.

MORE DETAILED DESCRIPTION

Figure 1:
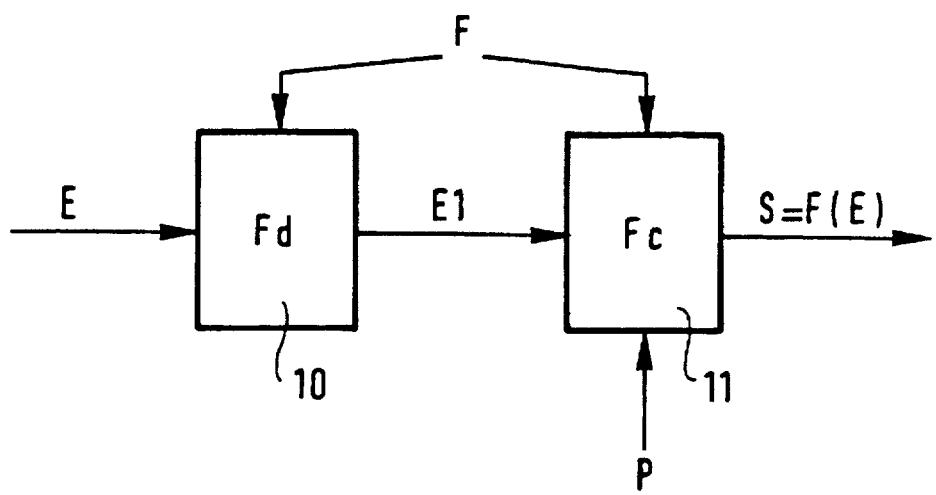
FIG. 1 represents an electronic stage to be adjusted by means of a correction stage situated downstream therefrom.
Figure 2:
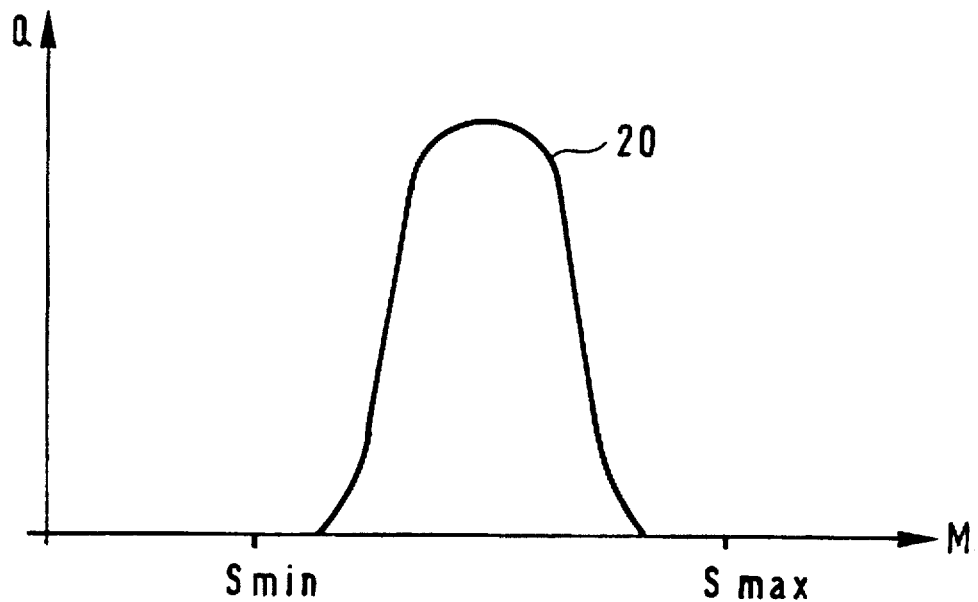
FIG. 2 is a capability curve of function measurements performed on articles that have been adjusted.

FIGS. 1 and 2 are described above with reference to the prior art.

Figure 3:
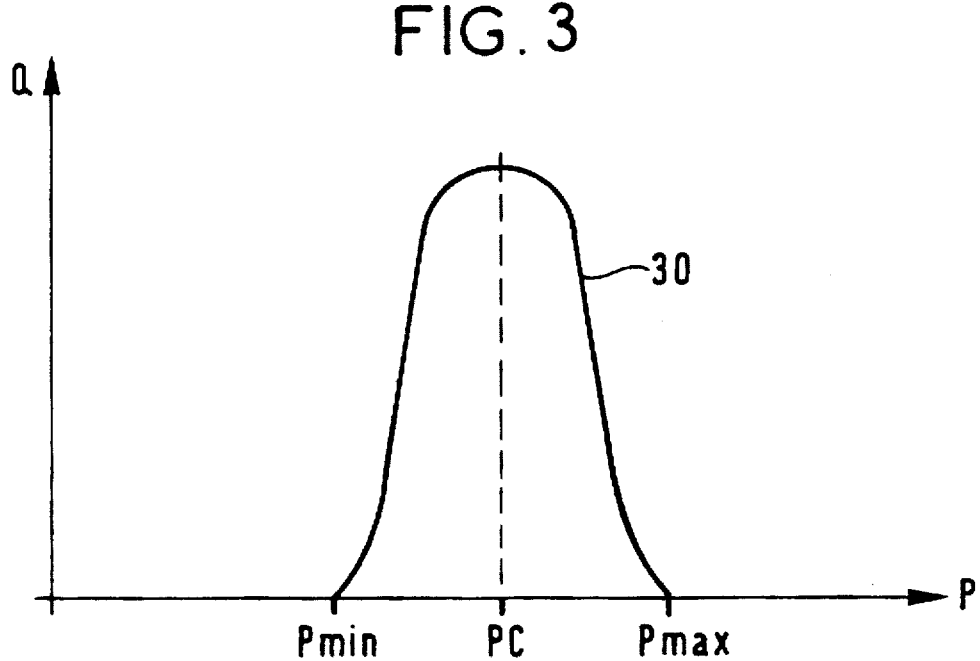
FIG. 3 is a capability curve of an adjustment parameter.

FIG. 3 is a capability curve 30 for an adjustment parameter. The curve 30 is Gaussian and represents the quantity of adjusted articles Q as a function of the value of a parameter P The parameter P may take values lying between a minimum parameter Pmin and a maximum parameter Pmax. By way of example, if the parameter is a digital value encoded on 4 bits, Pmin is 0000 and Pmax is 1111. The curve 30 has a mean value PC, where PC is referred to as a "centered parameter". The following equation applies:

$$PC = \frac{1}{N} \sum_{i=1}^{N} Pi$$

where N is the number of parameters under consideration.

In a first step, functional adjustment consists in setting the value of PC (P=PC) in each article prior to adjustment. Then, a predetermined stimulus (frequency, voltage, slope, ...) is applied to the function to be corrected, and the response of said function is measured.

Figure 4:
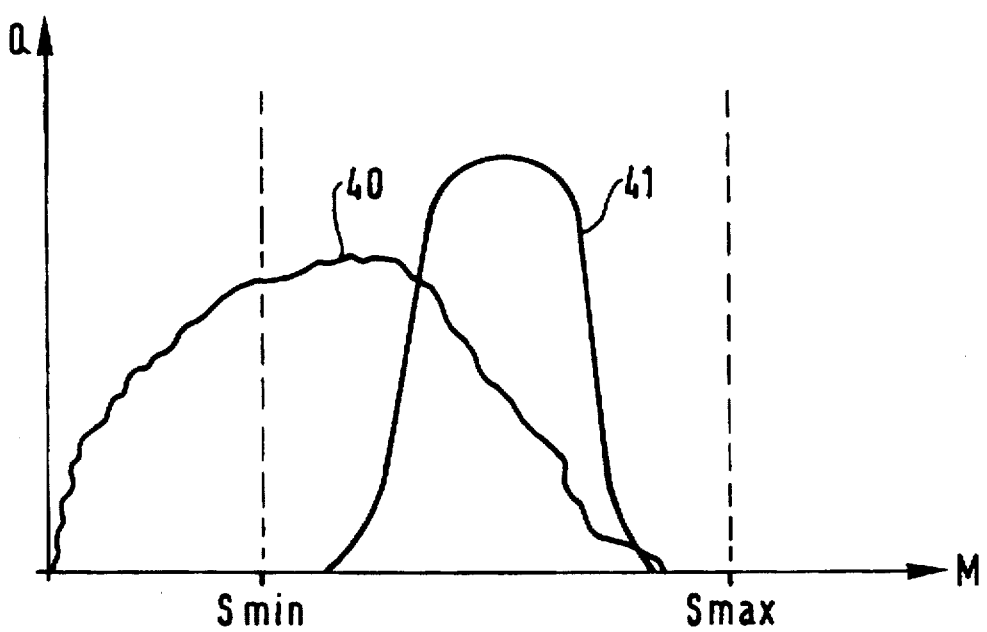
FIG. 4 shows the capability curve of measurements performed while the centered parameter is set in each correction stage.

FIG. 4 is the capability curve for the measurement associated with the electronic function to be adjusted, while the correction parameter contained in the correction stage is still the mean value PC of the optimum capability curve of correction parameters for this function.

The capability curve of measurements as actually measured is referenced 40, while the optimum capability curve for measurements with good correction parameters is referenced 41. It can be seen that if PC is used as the reference value in every correction stage, because of component dispersion, responses are obtained that lie outside an acceptance range (Smin, Smax), even though many of the articles do indeed provide responses lying within said range.

Since those responses are satisfactory, there is no need to seek to obtain an optimum response, and that serves to limit adjustment time.

After an initial step of storing the mean value of the capability curve for said function in each correction stage, the invention proposes a further step of measuring the responses of a fraction of the population of articles and then storing a table in which each measurement lying outside a predetermined range is associated with a corresponding correction parameter. These measurements lying outside the predetermined range constitute "reference" measurements and they are used both for adjusting the functions of other articles and for updating the value PC. Thus, on each subsequent measurement lying outside the predetermined range, the table is consulted to find the reference measurement that is closest (to within some margin, epsilon) to the subsequent measurement, and the centered parameter originally stored in the function correction stage is replaced with the correction parameter associated with the reference measurement.

Figures 5, 6:
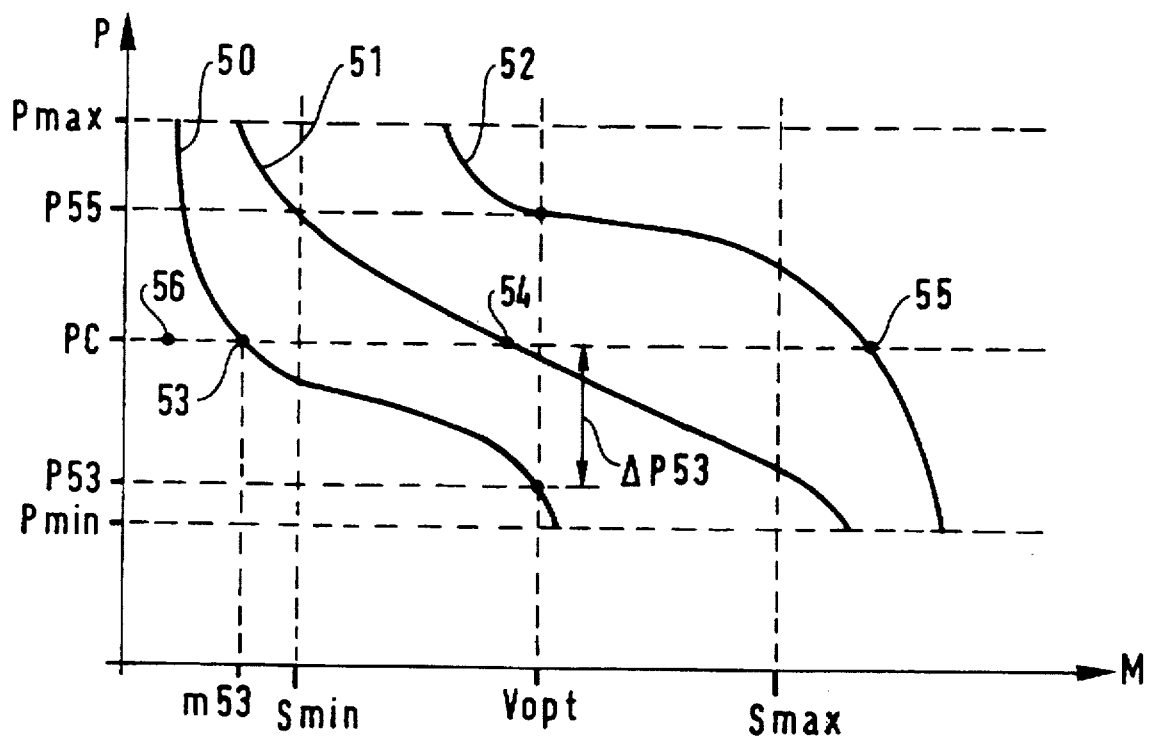
FIG. 5 shows variations in the measured responses of a sample of three articles in response to a correction parameter varying between its minimum and maximum values.
FIG. 6 is a table in which measurements situated outside the tolerance range are stored together with corresponding correction parameters.

The theory will be better understood on reading the following description of FIG. 5 which shows how the responses measured on a sample of three articles vary for a correction parameter that varies between its minimum and maximum values. These three variations in response are given by curves referenced 50, 51, and 52. As a function of the parameter P, each unit comprising an electronic function stage coupled to a correction stage provides a response lying inside or outside the acceptance range (Smin, Smax). Since each correction stage initially has the value PC stored therein, the various units provide first measurements that correspond to the points 53, 54, and 55. The points 53 and 55 lie outside the range (Smin, Smax), whereas the point 54 is situated within the range. Two approaches are then possible: either correction parameters P are sought such that the responses of the function plus correction units are equidistant from Smin and Smax (at an optimum value Vopt); or else correction parameters are acceptable so long as they give rise to responses lying within the range (Smin, Smax). In an optimum adjustment approach, for the function that provided response 53, it would be necessary to reduce the value of PC by an amount ΔP53 so that the parameter PC is replaced by a parameter P53, whereas a correction parameter P55 would be necessary for the correction stage applied to the function that gives the response 55.

The invention proposes storing the various measurements that lie outside the range (Smin, Smax) together with the corresponding correction parameters. By way of example, for an optimum adjustment approach, the value m53 is stored which corresponds to the above-described response, and it is associated with the parameter P53. A table is thus built up in which each measurement lying outside the range (Smin, Smax) is associated with the corresponding correction. Such a table is shown in FIG. 6.

The table of FIG. 6 comprises a plurality of measurements m1 to mn each associated with a correction parameter P1 to Pn. The measurements m1 to mn are referred to as "reference" measurements. Consider the case where the electronic function of another particular article is subjected to the same input stimulus and provides a response referenced 56 in FIG. 5. Under such circumstances, the table associating each reference measurement with a correction parameter is searched to find the reference measurement which is closest to the response 56. Assuming that this closest reference measurement is the measurement m53, then the parameter being adjusted in the correction stage for the function under consideration will be replaced with P53 which is the parameter associated with the reference measurement m53.

The table of FIG. 6 can be filled out as measurements take place: if the measurement obtained is to be found in the table, to within some margin of error epsilon, then the corresponding correction parameter is stored in the correction stage. However, if the measurement obtained is not to be found in the table, to within epsilon, then the measurement is stored in the table and the corresponding parameter is discovered, e.g. by using a known adjustment algorithm that seeks, for example, to obtain an optimum response situated halfway between the two tolerance threshold values.

The adjustment method of the invention is based on a compromise between optimizing the adjustment obtained and minimizing the number of samples used for updating or for constructing the correspondence table between reference measurements and the associated correction parameters, while simultaneously taking account of the dispersion in electronic functions. The greater the number of reference measurements and the smaller the dispersion, the nearer the adjustment will be to optimal, i.e. the nearer will be the response of each electronic function associated with its correction to the optimum response Vopt.

It is important to update the value of PC on a regular basis, e.g. whenever the percentage of the population of articles associated with measurements lying outside the predetermined range exceeds some predetermined percentage. This ensures that drift in the function will be taken into account.

The tolerance range over which measurements are considered acceptable need not be finite, for example it might lie between a given value and infinite (up to infinity), or it may be constituted by the union of two ranges.

After the centered parameter PC has been replaced by the parameter associated with the closest reference measurement, it is preferable to perform a further measurement in order to confirm that the combined response of the electronic function plus correction unit to the predetermined stimulus does indeed lie within the predetermined range.

The method of the invention is also applicable to adjusting a plurality of parameters to be found in a plurality of correction functions in series or in parallel. Known techniques are used to minimize the effect of other functions on the function that is to be adjusted.

Another approach which is applicable when adjusting parameters in parallel consists in measuring the combined response of functions and their associated corrections at the outlet of some other stage that is neutral with respect to the dispersion which is to be corrected. For example, if each of two function stages operating in parallel is followed by a respective correction stage in turn coupled to a common neutral output stage of function Fn, then $\underline{m}$ is measured where m=Fn(m1, m2) and m1 and m2 are the responses of the two assemblies to be corrected. It is then possible to draw up a table associating $\underline{m}$ with (m1, m2). If a plurality of pairs (m1, m2) exist for a given $\underline{m}$, then selection will be based on consistency with tables of m1/P1 and m2/P2.

The method of the invention may be applied to adjusting electronic functions to be found in radiotelephones of the type specified by Groupe Speciale Mobile (GSM). In general, the invention is applicable to compensating any dispersion that can be corrected in an electronic or electrical apparatus.

What is claimed is:

1. A method of adjusting an electronic function implemented in an article forming a part of a population of articles to be adjusted, said electronic function presenting dispersion from one article to another, the article including a dispersion correction stage coupled with said electronic function and storing an initial parameter determining an amount of correction to be applied to said electronic function, said initial parameter being replaceable with a correction parameter to adjust a combined response of the electronic function plus the correction stage to a predetermined input stimulus, said method comprising the steps of:

selecting as said initial parameter a value corresponding to the mean value of a capability curve of correction parameters for said function;

measuring a combined response of the electronic function plus the correction stage to a predetermined input stimulus;

determining whether said response is within an acceptable range;

if said response is outside of said acceptable range, replacing the initial parameter with a correction parameter which will cause said dispersion correction stage to impart an amount of correction to said electronic function whereby said combined response will be within said acceptable range;

updating the mean value to be used for said initial parameter in the testing of subsequent articles whenever a percentage of articles for which said measured response falls outside said acceptable range becomes greater than a predetermined percentage;

maintaining a table of measurements outside of said acceptable range in association with corresponding correction parameters, said measurements constituting "reference" measurements;

for each new measurement that lies outside said acceptable range, determining if there exists a corresponding reference measurement in said table that is within a predetermined range of said new measurement, and if so, replacing said initial parameter with the correction parameter associated with said corresponding reference measurement; and if there does not exist a corresponding reference measurement in said table that is within a predetermined range of said new measurement, determining a new corresponding correction parameter which will cause said dispersion correction stage to impart an amount of correction to said electronic function whereby said combined response will be within said acceptable range, storing said new measurement in said table in association with a new corresponding correction parameter, and replacing the initial parameter in the article with the new correction parameter.

2. A method according to claim 1, where each correction factor causes said dispersion correction stage to impart an amount of correction to said electronic function whereby said combined response will be substantially in the center of said acceptable range.

3. A method according to claim 1, wherein, whenever said initial parameter is replaced by said correction parameter associated with said reference parameter, the method further comprises performing a measurement to confirm that the combined response of said electronic function plus correction stage to said predetermined stimulus is situated in said acceptable range.

* * * * *